(12) United States Patent
Balducci

(10) Patent No.: US 10,331,914 B2
(45) Date of Patent: Jun. 25, 2019

(54) SYSTEM AND METHOD FOR KVM APPLIANCE FORMING A SECURE PERIPHERAL SHARING SWITCH TO PREVENT DATA LEAKAGE

(71) Applicant: AVOCENT HUNTSVILLE CORP., Huntsville, AL (US)

(72) Inventor: Michael J. Balducci, Arab, AL (US)

(73) Assignee: Vertiv IT Systems, Inc., Columbus, OH (US)

( * ) Notice: Subject to any disclaimer, the term of this patent is extended or adjusted under 35 U.S.C. 154(b) by 0 days.

(21) Appl. No.: 15/117,566

(22) PCT Filed: Jun. 24, 2015

(86) PCT No.: PCT/US2015/037453
§ 371 (c)(1),
(2) Date: Aug. 9, 2016

(87) PCT Pub. No.: WO2015/200499
PCT Pub. Date: Dec. 30, 2015

(65) Prior Publication Data
US 2016/0371511 A1    Dec. 22, 2016

Related U.S. Application Data

(60) Provisional application No. 62/017,513, filed on Jun. 26, 2014.

(51) Int. Cl.
*G06F 21/00* (2013.01)
*G06F 21/85* (2013.01)
(Continued)

(52) U.S. Cl.
CPC .............. *G06F 21/85* (2013.01); *G06F 21/83* (2013.01); *G06F 21/84* (2013.01)

(58) Field of Classification Search
CPC ........... G06F 21/85; G06F 21/83; G06F 21/84
See application file for complete search history.

(56) References Cited

U.S. PATENT DOCUMENTS 5,884,096 A * 3/1999 Beasley .................. G06F 3/023
345/4
6,633,905 B1 * 10/2003 Anderson ................ G06F 1/26
709/219
(Continued)

FOREIGN PATENT DOCUMENTS

EP         2685387 A2    1/2014
KR    1020100104708 A    9/2010

OTHER PUBLICATIONS

International Search Report regarding Application No. PCT/US2015/037453, dated Sep. 23, 2015.
(Continued)

*Primary Examiner* — John B King
(74) *Attorney, Agent, or Firm* — Harness, Dickey & Pierce, P.L.C.

(57) ABSTRACT

The present disclosure relates to a KVM appliance for preventing the passing of status information between a target computer, which is in communication with the KVM appliance, and a peripheral of a user. The KVM appliance may comprise a housing, an indicator supported on the housing, and a main processing unit (MPU) for receiving status information. The MPU monitors status information received by it and determines when the received status information is of a specific type which is used to set the indicator, which in turn apprises the user of a real time status of a feature of the peripheral. When the status information is identified as being of the type to set the indicator, it is then used to set the indicator to indicate the real time status of the feature to the user of the peripheral.

20 Claims, 5 Drawing Sheets

(51) Int. Cl.
*G06F 21/83* (2013.01)
*G06F 21/84* (2013.01)

(56) References Cited

U.S. PATENT DOCUMENTS

| | | | |
|---|---|---|---|
| RE44,814 E * | 3/2014 | Perholtz | 379/38 |
| 2002/0091850 A1* | 7/2002 | Perholtz | H04M 11/045 709/231 |
| 2005/0044236 A1* | 2/2005 | Stafford | H04L 29/06027 709/227 |
| 2006/0202964 A1* | 9/2006 | Liaw | H04L 12/403 345/168 |
| 2007/0250623 A1* | 10/2007 | Hickey | G06F 1/266 709/224 |
| 2007/0250649 A1* | 10/2007 | Hickey | G06F 13/385 710/62 |
| 2008/0162752 A1* | 7/2008 | Huang | G06F 13/4022 710/63 |
| 2009/0044127 A1* | 2/2009 | Bates | G06F 13/4022 715/736 |
| 2009/0259792 A1* | 10/2009 | Matsunaga | G06F 3/038 710/316 |
| 2011/0208963 A1* | 8/2011 | Soffer | G06F 3/023 713/168 |
| 2012/0284449 A1* | 11/2012 | Tung | G06F 3/023 710/316 |
| 2012/0307436 A1* | 12/2012 | Dickens | H01R 13/6461 361/679.02 |
| 2012/0331212 A1 | 12/2012 | Batish et al. | |
| 2014/0019648 A1 | 1/2014 | Huang | |
| 2014/0208442 A1* | 7/2014 | Mooring | G06F 9/45533 726/30 |
| 2015/0365237 A1* | 12/2015 | Soffer | G06F 21/85 726/20 |

OTHER PUBLICATIONS

Written Opinion regarding Application No. PCT/US2015/037453, dated Sep. 23, 2015.

* cited by examiner

SYSTEM AND METHOD FOR KVM APPLIANCE FORMING A SECURE PERIPHERAL SHARING SWITCH TO PREVENT DATA LEAKAGE

CROSS REFERENCE TO RELATED APPLICATIONS

The present application is a U.S. National Phase Application under 35 U.S.C. 371 of International Application No. PCT/US2015/037453, filed on Jun. 24, 2015. This application is based on and claims priority from U.S. provisional application Ser. No. 62/017,513, filed Jun. 26, 2014. The entire disclosures of all of the above applications are hereby incorporated by reference into the present application.

FIELD

The present disclosure relates to secure peripheral sharing switch ("PSS") systems, and more particularly to a secure PSS system and method that eliminates the possibility of data leakage via a peripheral which is communicating with the PSS system.

BACKGROUND

The statements in this section merely provide background information related to the present disclosure and may not constitute prior art.

Secure peripheral sharing switch ("PSS") systems are often used in applications where a peripheral, for example a keyboard, is being used to communicate with two different computer systems. One specific type of PSS system is a keyboard, video and mouse ("KVM") system. For the sake of convenience, the present disclosure will make reference to a KVM system as the specific type of PSS under consideration, with the understanding that a KVM system is merely meant as one example. Thus, the teachings of the present application may be applied to other types of PSS systems besides a KVM system.

KVM systems enable a single keyboard, mouse and video display device to communicate through a KVM appliance with one, two or more different target computers. Two or more of the target computers may be operating on different networks, often with different security levels. For example, one network may be a "classified" network and the other may be an "unclassified" network. When two or more target computers or other types of computing, peripheral or network devices are interfaced to the KVM appliance, a challenge arises with preventing data leakage from the user's computer or peripheral, back through the KVM appliance, to a different target computer. Such data leakage also presents a concern when a KVM appliance is used to provide a single computer or peripheral with shared access to two or more different networks, where the networks are designated with different security levels.

If a KVM appliance is being used to initially interface the user's keyboard, mouse and display terminal to a first target computer operating on a first network, information may be transmitted both from the user's keyboard and mouse to the first target computer, as well as from the first target computer to the user's keyboard. The data transmitted from the first target computer to the user's keyboard may be, for example, data that is temporarily stored by the user's keyboard and controls setting a status indicator on the user's keyboard. In one example the data may be data that sets a lamp associated with the Caps Lock key on the user's keyboard, in response to the user pressing the Caps Lock key on the keyboard. Alternatively, the data could be used to set a scroll lock indicator or a numbers lock indicator on the keyboard. When the KVM appliance is used to switch the user's peripheral to communicate with a second target computer, for example operating on a second network, then the data which has been sent to the user's keyboard and is being stored by the user's keyboard (e.g., to set the Caps Lock lamp) may be passed (i.e., "leaked") to the second target computer as soon as the second target computer begins communicating with the user's keyboard.

The above described sharing or "leakage" of information from the user's peripheral from one target computer to another is not limited to just status information passed to the user's keyboard, but could potentially extend to virtually any other type of information that is shared between a target computer and the user's keyboard or mouse via the KVM appliance. While such keyboard status information is frequently used to set some type of status indicator on a keyboard or other peripheral that the user is using, this type of information is not necessarily limited to just status information used with a keyboard. Those skilled in the art will appreciate that various other peripherals often used by a user in a KVM setting may include some small amount of memory for temporarily storing information received from a target computer during a KVM session. In such instances it is highly undesirable if information can be passed/leaked from one target computer or device to a different target computer or device. And in many applications where a peripheral is able to be shared via a KVM to connect to computing device that access both classified and unclassified networks, such as in governmental and/or military settings, regulations may be in place that absolutely prohibit information leakage.

Previous attempts to prevent information from being leaked from a peripheral communicating with one target computer to a different target computer, via a KVM appliance, have been less than fully satisfactory. One such attempt has involved simply preventing the status information from being passed to the shared peripheral (e.g., the user's keyboard). However, this provides the drawback that the user is not provided with the status information. In some instances, such as where the status information would ordinarily be used to set a Caps Lock indicator on the user's keyboard, the user would not know that the Caps Lock is turned on. This could present a frustrating situation for the user if the user is required to enter a password into a dialog box having hidden characters, and where some characters of the password are required to be in capital letters or symbols. Other attempts to address this challenge have met with limited success.

SUMMARY

In one aspect the present disclosure relates to a KVM appliance for preventing the passing of status information between a target computer, which is in communication with the KVM appliance, and a peripheral of a user. The KVM appliance may comprise a housing, an indicator supported on the housing, and a main processing unit (MPU) for receiving status information. The MPU may be configured to monitor status information received by it and to determine when the received status information is of a specific type of status information used to set the indicator, which in turn apprises the user of a real time status of a feature of the peripheral. When the specific type of status information is identified as being of the type to set the indicator, the specific type of status information is used to set the indicator to indicate the real time status of the feature to the user of the peripheral.

In another aspect the present disclosure relates to a KVM appliance for preventing the passing of status information between a target computer in communication with the KVM appliance, and a peripheral of a user. The KVM appliance may comprise a housing, an indicator supported on the housing, and a main processing unit (MPU). The MPU may receive a first code pertaining to status information when a user selects a predetermined feature associated with the peripheral. At least one target processing unit (TPU) may be used for interfacing the MPU with the target computer. The TPU is configured to pass the first code to the target computer and to receive status information including a second code associated with the predetermined feature. The second code is used to set the indicator on the KVM housing.

In still another aspect the present disclosure relates to a method for preventing the passing of status information between a target computer in communication with the appliance, and a peripheral of a user which is communicating with the target computer via a KVM appliance. The method may comprise using the KVM appliance to detect the presence of a code associated with status information which is at least one of received from the peripheral or received from the target computer, and where the status information is related to a predetermined feature of the peripheral. The method also involves causing the KVM appliance to use the status information to set an indicator on the KVM appliance which provides real time notice to the user that the predetermined feature is active.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
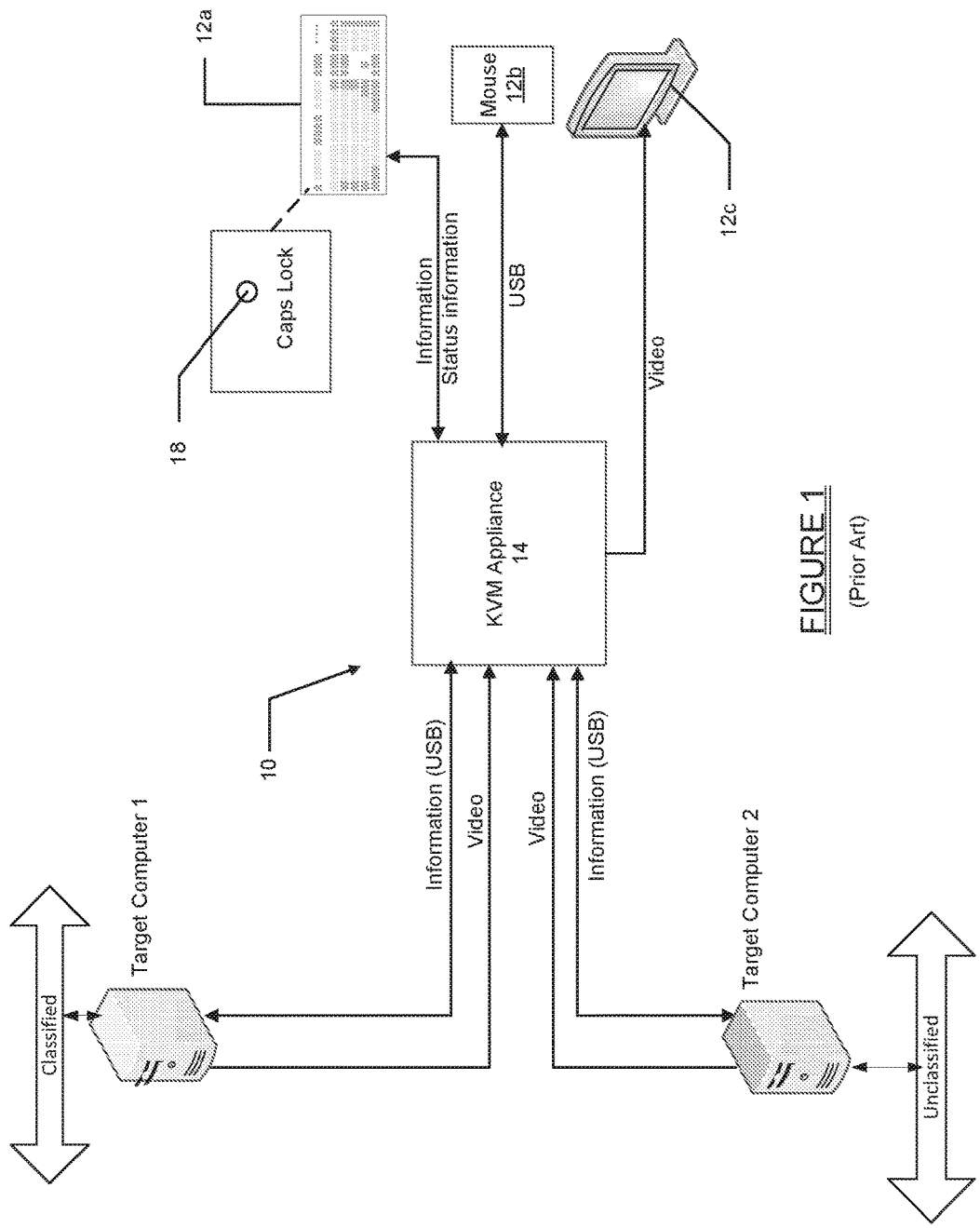
FIG. 1 is a high level block diagram of a prior art system illustrating how information may be passed back and forth between a user's keyboard to two target computers (Target Computer 1 and Target Computer 2) operating on two different networks, via a KVM appliance.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a prior art system 10 in which two target computers (i.e., Target Computers 1 and 2) are in communication with a plurality of peripherals that a user is using. In this example a keyboard 12a forms one peripheral, a mouse 12b forms another peripheral, and a display terminal 12c forms still another peripheral. The peripherals 12a-12c are connected via a secure KVM appliance 14 (hereinafter "KVM appliance" 14) to either of Target Computers 1 or 2. This prior art arrangement presents the challenge that if either Target Computer 1 or Target Computer 2 sends information to any of the peripherals 12a-12c, for example to set a Caps Lock LED 18 on keyboard 12a, and then the KVM appliance 14 is set to communicate with the other one of the Target Computers 1 or 2, then stored status information may be passed from the keyboard 12a to the newly connected Target Computer (i.e., the other one of Target Computers 1 or 2). Effectively, the information transmitted to set the Caps Lock indicator lamp 18 on the keyboard 12a is temporarily stored in the keyboard 12a and then transmitted (i.e., leaked) to the other Target Computer (i.e., the other one of Target Computers 1 or 2), back through the KVM appliance 14, once the connection is made between the keyboard 12a and the other Target Computer.

Figure 2:
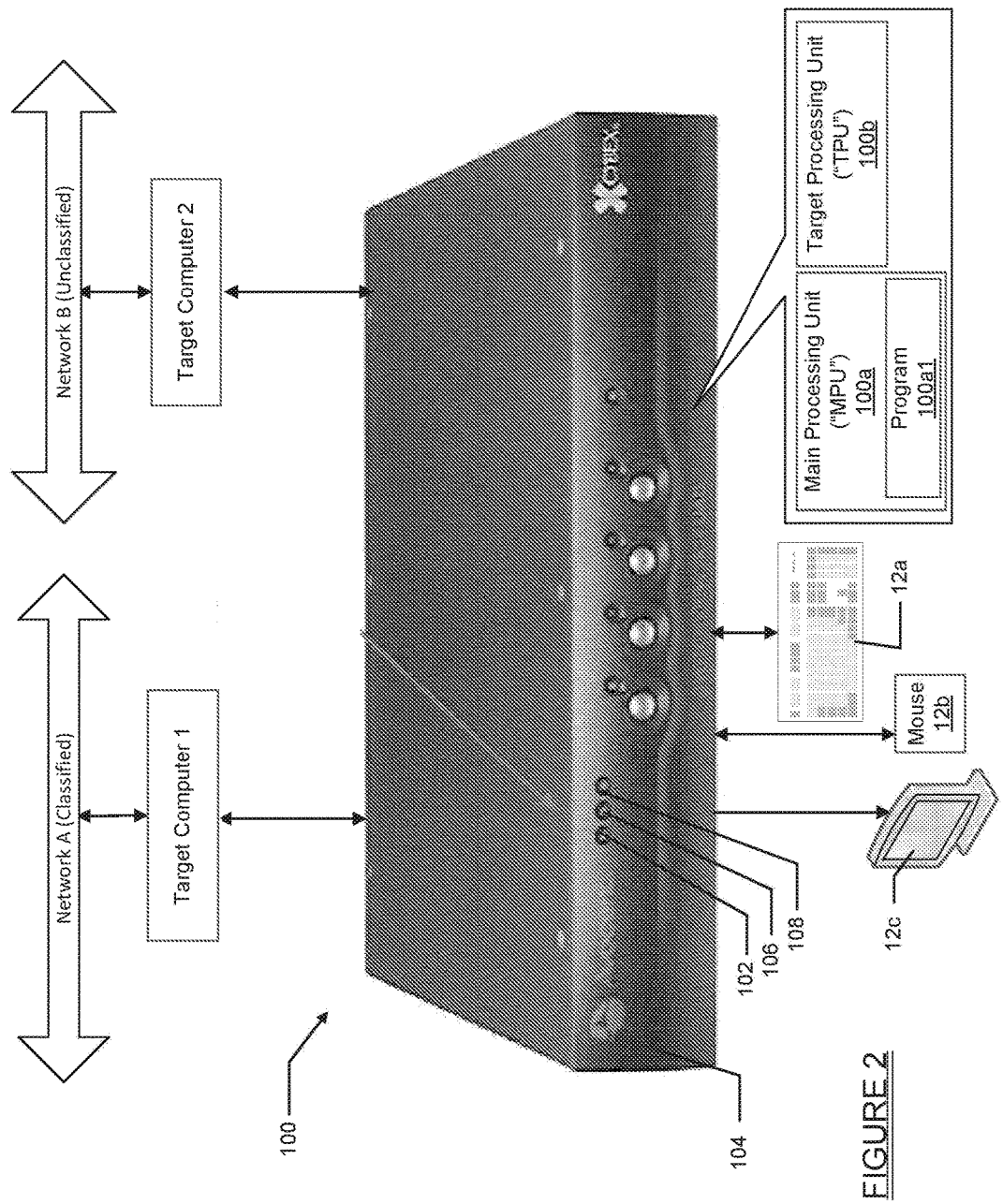
FIG. 2 is an illustration of a new secure KVM appliance that incorporates status indicators for "Caps Lock" and other features, so that different types of status information can be visually provided to the user without the need to pass such information to a peripheral that the user is using.

Referring to FIG. 2, a system 100 is shown in accordance with one embodiment of the present disclosure which eliminates the possibility of information being leaked from the keyboard 12a or other peripheral being used to communicate with the Target Computers 1 and 2. In this example the system 100 takes the form of a secure KVM appliance 100 that incorporates a main processing unit 100a ("MPU 100a") and a target processing unit 100b ("TPU 100b"). The MPU 100a runs a non-transitory, machine readable program 100a1 stored in a non-volatile memory (not shown). The TPU 100b operates to receive information from the user's peripherals (e.g., keyboard 12a and/or mouse 12b) and to report the information to one of the two Target Computers 1 or 2, whichever is selected at the time.

The KVM appliance 100 also includes at least one status indicator component 102 for indicating a key status of a specific key on the keyboard 12a. The MPU 100a uses the program 100a1 to detect when one or more specific types of information, such as information required to set a status indicator lamp on the keyboard 12a, which is the type of information that should not be passed to the keyboard 12a, is received by the KVM appliance 100 from a Target Computer. The MPU 100a intercepts this information and instead of passing it to the keyboard 12a, uses it to set the status indicator component 102 which is associated with the Caps Lock feature of the keyboard 12a. In this manner the user is still apprised of the status by simply viewing the status indicator component 102 on a front panel 104 of the KVM appliance 100, while the KVM appliance 100 prevents the status information from being transmitted to the user's keyboard 12a. In alternative configurations a "Scroll Lock" indicator component 106 may be set, and/or a "Numbers Lock" indicator component 108 may be set, if the user has pressed a "Scroll Lock" key or a "Numbers Lock" key on the keyboard 12a. These are merely a few examples of what type of status indicator components may be incorporated on the KVM appliance 100. Those skilled in the art will appreciate that the status of various other keys of a keyboard, or virtually any other peripheral, such as the mouse 12b or display terminal 12c, could just as readily be included on the KVM appliance 100 along with a suitable modified program to detect when specific types of information have been received by the KVM appliance 100 to set the appropriate status indicator component. Also, it should be appreciated that while the KVM appliance 100 is only shown with three status indicator components 102, 106 and 108, virtually any number of different status indicators may be provided depending upon how many different types of status one wishes to be able to display on the front panel 104.

Figure 3:
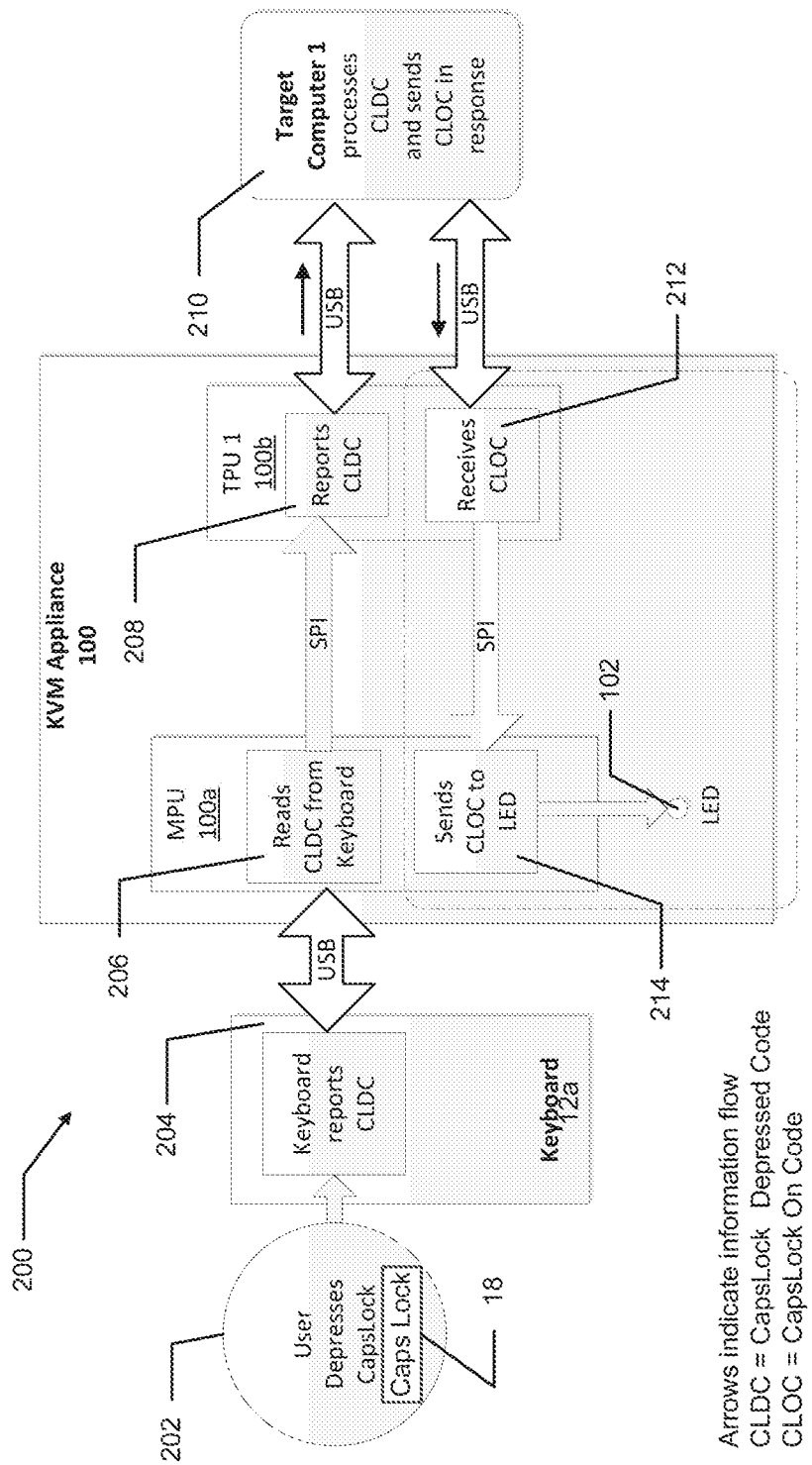
FIG. 3 is a high level flow diagram illustrating operations that may be performed by the secure KVM appliance of FIG. 2 to detect and use status information received by it from a target computer to set a status indicator on the KVM appliance, and to prevent the status information from being passed to a peripheral in communication with the secure KVM appliance.

FIG. 3 is a diagram 200 illustrating in greater detail how the system 10 of the present disclosure works to prevent specific types of information from being passed from a Target Computer (i.e., in this example Target Computer 1, which is on a classified network) back through the KVM appliance 100 (FIG. 2) to a peripheral that the user is using. In this example the peripheral is the keyboard 12a (FIG. 1). Target Computer 1 has received information indicating that some event has occurred. As a result, it sends a CLOC ("Caps Lock On Code") to the keyboard 12a on its own, that is, without having first received a CLDC ("Caps Lock Depressed Code"). The keyboard 12a stores the just-received CLOC. At some later point, if the user were to switch the KVM 100 from Target Computer 1 to a different Target Computer, for example, Target Computer 2, which in this example is on an unclassified network, then Target Computer 2 would read the keyboard status and retrieve the information that the spurious CLOC was received. Even though this is only 1 bit (CapsLock or No CapsLock), information will have been transferred from the classified network to the unclassified network. Other scenarios are possible where a sequence of CapsLock On/Off messages are sent to transfer larger amounts of data to the peripheral that are later retrieved by a different computer when the peripheral is switched to that computer. CapsLock on messages could be used to represent a '1' and CapsLock off messages used to represent a '0'—e.g., Using CLOC/CLFC for On/Off, the sequence (CLFC,CLOC,CLOF,CLOF, CLOF,CLOF,CLOF,CLOC) would represent binary 01000001, which is ASCII character 'A'.

Referring further to FIG. 3, with the system 10 of the present disclosure, the above action of passing information from one Target Computer to a different Target Computer, via the user's peripheral, cannot occur. To explain this, consider that at operation 202 the user depresses the CapsLock key 18. The keyboard 12a reports a CLDC having been generated at operation 204. A main processing unit 100a ("MPU 100a") of the KVM appliance 100 then reads the CLDC from the keyboard 12a, as indicated at operation 206. The MPU 100a transmits the CLDC to a target processing unit 100b ("TPU 1 100b") of the KVM appliance 100 via a suitable bus, in this example a bidirectional serial peripheral interface ("SPI") bus 100c. TPU 1 100b reports the CLDC at operation 208 to Target Computer 1 via a suitable bus, which in this example is shown as a USB. It will be appreciated that virtually any other suitable form of bus besides those examples shown in FIG. 3 may potentially be used.

At operation 210, Target Computer 1 processes the received CLDC and sends a CLOC in response, via a USB, back to the TPU 1 100b. The TPU 1 100b receives the CLOC at operation 212. The TPU 1 100b then sends the CLOC via the serial peripheral interface bus 100c to the MPU 100a. The MPU 100a, using the program 100a1, identifies the received information as the CLOC and then sends the CLOC to the status indicator component 102 as indicated in operation 214. In this example the status indicator component 102 is an LED, which when illuminated provides a visual indication that the "CapsLock" feature of the keyboard is turned on.

Figure 4:
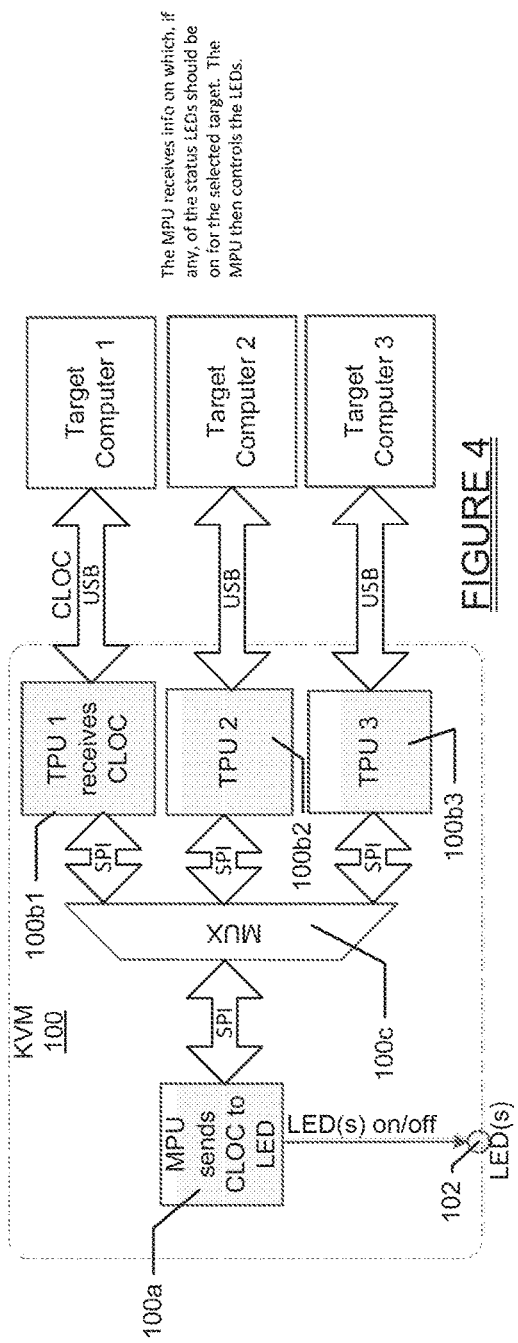
FIG. 4 is a high level view of a system in accordance with another embodiment of the present disclosure in which a multiplexer is incorporated, and in which the MPU controls the multiplexer to receive a code directly from a selected one of a plurality of target processing units (TPUs), which the MPU then sends to the indicator.
Figure 5:
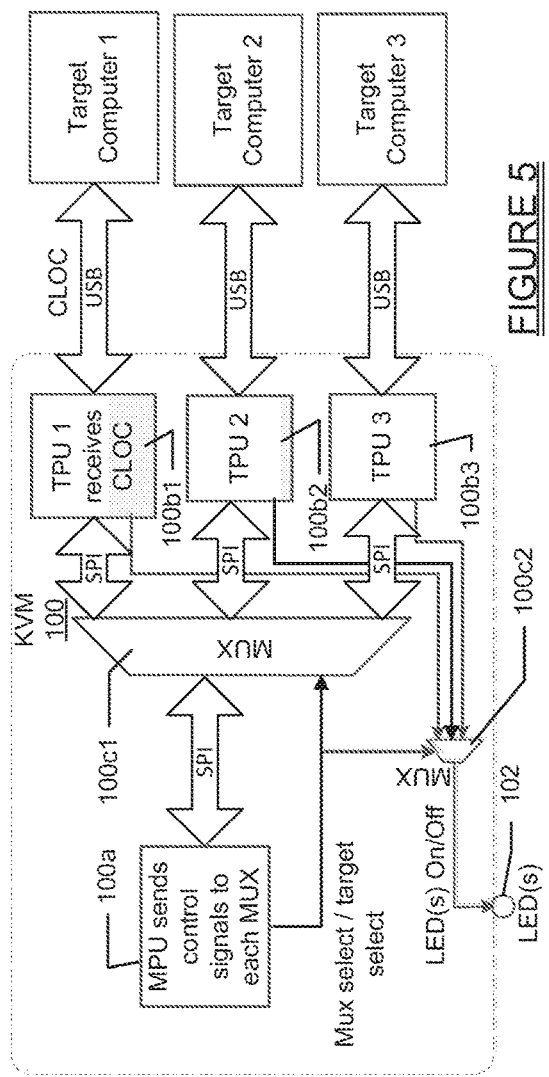
FIG. 5 is a high level view of a system in accordance with another embodiment of the present disclosure in which a code representing status information is transmitted directly from a selected one of a plurality of TPUs to a multiplexer, which is then controlled by the MPU so that the code is sent directly to the indicator without needing to be handled by the MPU.

Referring to FIGS. 4 and 5, alternative arrangements for detecting the status information are shown. In FIG. 4, the MPU 100a is in communication with a multiplexer 100c. The multiplexer 100c is in turn in communication with a plurality of target processing units (TPUs) 100b1-100b3. The TPUs 100b1-100b3 are independently associated with a plurality of Target Computers 1-3. The Target Computers 1-3 may each be operating on separate networks or on only one or two networks. In this embodiment the MPU 100a controls the multiplexer 100c to select one of the TPUs 100b1-100b3 for communication with at a time. In this example the user has previously selected Target Computer 1 as the computer to communicate with by actuating a selection control (e.g., button) on the KVM appliance 100. This signals the MPU 100a that Target Computer 1 is the computer that the user wishes to communicate with. The MPU 100a then knows to select TPU 100b1 for use. Now consider that TPU 100b1 has received the CLOC from Target Computer 1. Since the TPU 100b1 has been selected for communication by the MPU 100a, the CLOC will be passed from the multiplexer 100c to the MPU 100a. The MPU 100a will then transmit the CLOC only to the indicator 102, which causes the indicator to be turned on. Thus, in this example the MPU 100a is used to obtain the CLOC and to pass the CLOC on to the indicator 102 to turn on the indicator. It will be appreciated that the MPU 100a could also be used in this embodiment to first receive the CLDC (CapsLock Depressed Code) from the keyboard 12a, and then to pass the CLDC to the TPU 1 100b1. However, in the examples of FIGS. 4 and 5, only the flow of information toward the MPU 100a is being shown (i.e., through the components circumscribed by the dashed line in FIG. 3).

In FIG. 5 another embodiment of the system 10 is shown which is somewhat similar to the embodiment of FIG. 4, but instead enables the CLOC to be passed directly to the indicator 102 without first being received by the MPU 100a. The MPU 100a in this example controls two multiplexers 100c1 and 100c2 to select a specific one of the TPUs 100b1-100b3 for communication with. The CLOC received by the selected TPU is then transmitted directly to the indicator 102 via multiplexer 100c2, which turns on the indicator 102. Multiplexer 100c1 is otherwise used to enable bidirectional communication for all other information with the selected Target Computer. Thus, with this embodiment, the CLOC is never received by the MPU 100a. As with the embodiment shown in FIG. 4, the embodiment of FIG. 5 could also use the MPU 100a to pass the CLDC received from the keyboard 12a on to the selected TPU 1 100b1-100b3. In an alternative embodiment, the status indicator 102 may instead be provided on a standalone component that is in communication with the KVM appliance 100 via an interface cable. As such, it is not absolutely required that the status indicator 102 be located on the KVM appliance 100, but it is anticipated that this may be a particularly popular and convenient means for implementing the status indicator 102.

Figure 6:
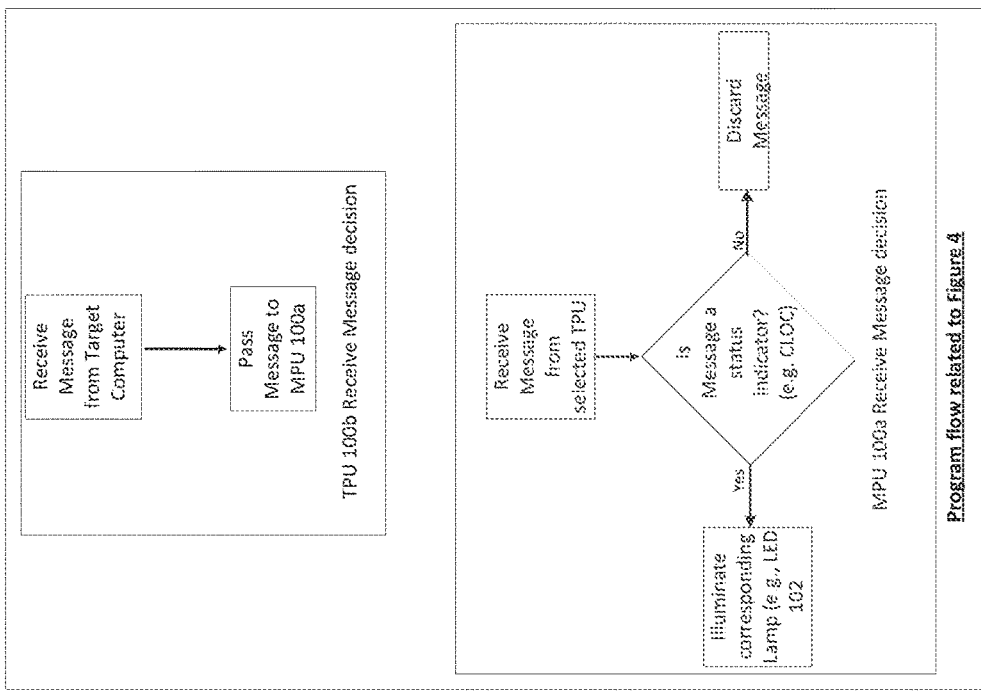
FIG. 6 is a high level flow diagram illustrating operations that may be performed by the KVM appliance, as configured in FIG. 4, to use the MPU of the KVM appliance to detect the receipt of the code and to pass the received code on to an indicator to turn on the indicator.

FIG. 6 illustrates one example of various operations that may be performed by the KVM appliance 100 for the configuration of FIG. 4, where the CLOC is initially passed to the MPU 100a and then passed on by the MPU 100a to the LED 102. The MPU 100a is used to determine if the received message ("Msg") is a status indicator. If it is not, then the message is discarded. The determination may be based on a comparison of the received message with one or more stored messages that represent different types of status indications.

Figure 7:
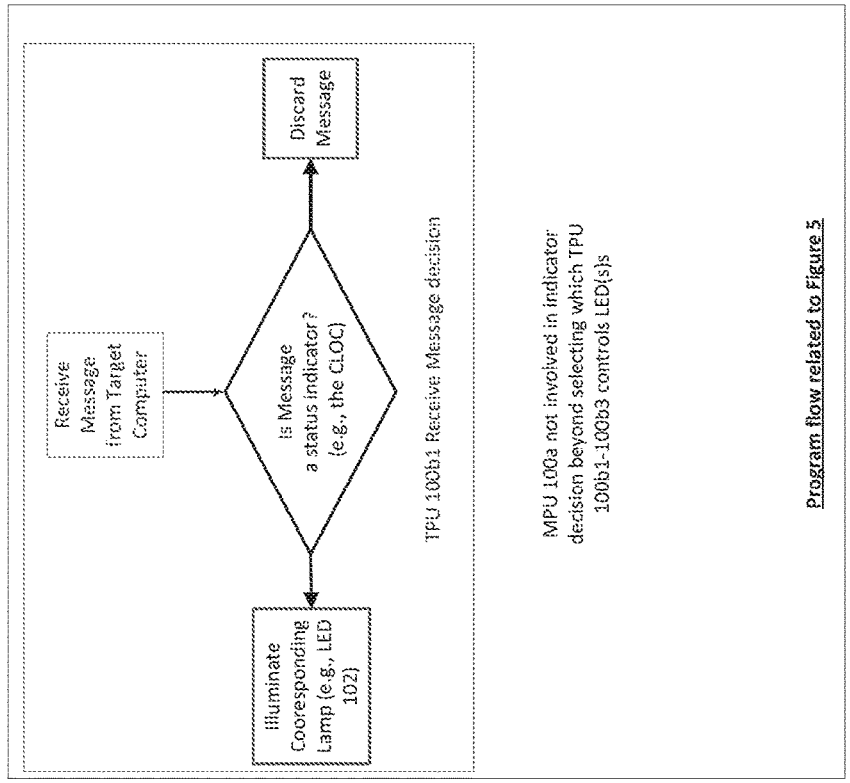
FIG. 7 is a high level flow diagram illustrating operations that may be performed by the KVM appliance, as configured in FIG. 5, so that the MPU of the KVM appliance is not involved with passing the code to the indicator.

FIG. 7 illustrates an example of various operations that the KVM appliance 100 may perform for the configuration of FIG. 5, where the CLOC is not passed to the MPU 100a. As is apparent from FIG. 7, the MPU 100a is not involved with passing the CLOC to the LED 102; rather, the MPU 100a is only involved with selecting the appropriate TPU 100b1-100b3 to use. With the configuration of FIG. 7, the selected TPU (TPU 100b1 in the example shown in FIG. 5) would use an internal program similar or identical to program 100a1 to determine if the received message indicates a change in the status indicator. The selected TPU would then pass the received CLOC to the MUX 10, which passes it to the LED 102.

The various embodiments of the KVM appliance 100 of the present disclosure thus positively eliminate the chance that status information can be leaked by a peripheral from one computer to another when the KVM appliance 100 is used to switch the peripheral to communicate with a different computer. This capability is expected to further significantly enhance security when a shared peripheral is being used to communicate with computers on two or more networks that have different security levels, and where the ability of the peripheral to leak information between the two networks would be considered a security breach.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A keyboard/video/mouse (KVM) appliance configured to preventing the passing of status information between a target computer in communication with the KVM appliance via a network, and a peripheral, associated with a computer, being used by a user, wherein the peripheral has a status indicator thereon, the KVM appliance comprising:
a housing;
an indicator supported on the housing;
a processing system configured to monitor for status information from the target computer;
the processing system configured to:
monitor received status information relating to operation of the user's peripheral;
determine when the received status information is of a specific type of status information used to set a status indicator on the user's peripheral, wherein the status information relates to a command initiated from the user's peripheral, and which in turn apprises the user of a real time status of a feature of the peripheral relating to the initiated command, and wherein the command initiated from the user's peripheral includes at least one of a capitals lock (CapsLock) command input, a numbers lock (NumbersLock) command input or a scroll lock (ScrollLock) command input, and where the status indicator includes at least one of a capitals lock (CapsLock) status indicator on a keyboard, a numbers lock (NumbersLock) status indicator on the keyboard, and a scroll lock (ScrollLock) status indicator on the keyboard; and
when the specific type of status information is identified as being of the type to set the at least one of the CapsLock, the ScrollLock or the NumbersLock status indicator on the user's peripheral, using the specific type of status information to set the indicator on the housing of the KVM appliance to indicate the real time status of at least one of the CapsLock, the ScrollLock or the NumbersLock to the user of the peripheral, and using the KVM appliance to prevent the received status information from being transmitted by the KVM appliance to the user's peripheral.

2. The KVM appliance of claim 1, wherein the processing system comprises a main processing Unit (MPU), and further comprising a target processing unit (TPU) communicating with both the MPU and with the target computer, and the TPU being configured to:
report the status information it receives from the MPU to the target computer; and
report a code relating to the status information received from the target computer to at least one of:
the MPU, to pass on to the status indicator; or
the status indicator, directly from the TPU.

3. The KVM appliance of claim 1, wherein the specific type of status information comprises status information used to set a CapsLock feature of a keyboard.

4. The KVM appliance of claim 1, wherein the specific type of status information comprises status information used to set a ScrollLock feature of a keyboard.

5. The KVM appliance of claim 1, wherein the specific type of status information comprises status information used to set a NumbersLock feature of a keyboard.

6. The KVM appliance of claim 1, wherein the status indicator comprises an element able to be illuminated when set using the specific type of status information.

7. The KVM appliance of claim 6, wherein the element comprises a Light Emitting Diode (LED).

8. The KVM appliance of claim 1, further comprising:
a multiplexer in communication with a main processing unit (MPU); and
a plurality of target processing units (TPUs) in communication with the multiplexer and also with a plurality of target computers, the multiplexer being controllable by the MPU to select one of the TPUs by which status information is supplied from the selected one of the TPUs to the MPU, the MPU then using the status information to set the status indicator.

9. A keyboard/video/mouse (KVM) appliance for preventing the passing of status information between a target computer in communication with the appliance and a peripheral of a user, the KVM appliance comprising:
a housing;
an status indicator supported on the housing;
a main processing unit (MPU) for receiving a first code from the user's peripheral pertaining to status information when a user selects a predetermined feature associated with the peripheral, and wherein the first code includes at least one of a capitals lock (CapsLock) command input from a keyboard peripheral, a numbers lock (NumbersLock) command input from the keyboard peripheral, and a scroll lock (ScrollLock) command input from the keyboard peripheral;

at least one target processing unit (TPU) for interfacing the MPU with the target computer;

wherein the TPU is configured to pass the first code to the target computer, and to receive status information including a second code associated with the predetermined feature; and wherein the second code includes a code pertaining to at least one of a CapsLock code, a NumbersLock code and a ScrollLock code, which is used to set the status indicator on the KVM housing, and the KVM appliance recognizes the second code as pertaining to at least one of the CapsLock command, the NumbersLock command and the ScrollLock command, prevents the second code from being transmitted back to the user's peripheral.

10. The KVM appliance of claim 9, further comprising:
a multiplexer in communication with the MPU; and
a plurality of target processing units (TPUs) in communication with the multiplexer and with a plurality of the target computers, the multiplexer being controllable by the MPU to select one of the TPUs by which the first and second codes are passed between the KVM appliance and a selected one of the target computers.

11. The KVM appliance of claim 10, wherein the MPU is configured to receive the second code directly from the selected one of the TPUs and to use the second code to set the status indicator.

12. The KVM appliance of claim 10, wherein the MPU is configured to control the multiplexer such that the selected one of the TPUs sends the second code directly to the status indicator to set the indicator.

13. The KVM appliance of claim 9, wherein the status information comprises status information which is used to set a CapsLock indicator of the keyboard peripheral.

14. The KVM appliance of claim 9, wherein the status information comprises status information used to set a ScrollLock indicator of the keyboard peripheral.

15. The KVM appliance of claim 9, wherein the status information comprises status information used to set a NumbersLock indicator of a keyboard peripheral.

16. The KVM appliance of claim 9, wherein the status indicator comprises an element able to be illuminated when set using the status information.

17. A method for preventing the passing of status information between a target computer and a peripheral of a user which is communicating with the target computer via a keyboard, video, mouse (KVM) appliance located between the peripheral and the target computer, the method comprising:

using the KVM appliance to detect the presence of a code associated with status information which is at least one of received from the peripheral or received from the target computer, and where the status information is related to a predetermined feature of the peripheral, wherein the predetermined feature relates to at least one of a capitals lock (CapsLock) command, a numbers lock (NumbersLock) command or a scroll lock (ScrollLock) command; and causing the KVM appliance to use the code to set an indicator on the KVM appliance which provides real time notice to the user that at least one of the CapsLock command, the NumbersLock command and the ScrollLock command has been received and is active; and using the KVM appliance to prevent the code from being passed back to the user's peripheral from the KVM appliance.

18. The method of claim 17, wherein the KVM appliance is configured to both receive an initial first code from the peripheral relating to a command associated with the predetermined feature of the peripheral, and also to receive the code from the target computer relating to the status information, and to use the code to set the indicator.

19. The method of claim 17, wherein using the status information comprises using at least two of:
status information relating to a CapsLock feature of a keyboard;
status information relating to a ScrollLock feature of a keyboard; and
status information relating to a NumbersLock feature of a keyboard.

20. The method of claim 17, wherein the operation of setting an indicator comprises illuminating an optical element mounted on the KVM appliance.

* * * * *